United States Patent
Frank et al.

(10) Patent No.: US 12,468,111 B2
(45) Date of Patent: Nov. 11, 2025

(54) METHOD FOR ADJUSTING THE HOLDER OF AN OPTICAL ELEMENT HELD IN A HOLDER, OPTICAL COMPONENT AND OPTICAL ASSEMBLY

(71) Applicant: Carl Zeiss Jena GmbH, Jena (DE)

(72) Inventors: Stefan Frank, Jena (DE); Michael Schulz, Tonna (DE); Manfred Kresser, Jena (DE); Martin Weiss, Jena (DE); Tobias Beier, Gera (DE)

(73) Assignee: Carl Zeiss Jena GmbH, Jena (DE)

( * ) Notice: Subject to any disclaimer, the term of this patent is extended or adjusted under 35 U.S.C. 154(b) by 986 days.

(21) Appl. No.: 17/615,092

(22) PCT Filed: May 15, 2020

(86) PCT No.: PCT/EP2020/063695
§ 371 (c)(1),
(2) Date: Nov. 29, 2021

(87) PCT Pub. No.: WO2020/239480
PCT Pub. Date: Dec. 3, 2020

(65) Prior Publication Data
US 2022/0221678 A1    Jul. 14, 2022

(30) Foreign Application Priority Data
May 31, 2019   (DE) .................. 102019114653.4
Jun. 7, 2019    (DE) .................. 102019115544.4

(51) Int. Cl.
*G02B 7/00*    (2021.01)
*B29D 11/00*   (2006.01)
*B24B 13/005*  (2006.01)

(52) U.S. Cl.
CPC ........ *G02B 7/003* (2013.01); *B29D 11/00942* (2013.01); *B24B 13/0055* (2013.01)

(58) Field of Classification Search
CPC .......... G02B 7/003; G02B 7/02; G02B 7/005; G02B 7/026; B24B 13/0055; G03F 7/70825; G03F 7/70258
See application file for complete search history.

(56) References Cited

U.S. PATENT DOCUMENTS

| | | | |
|---|---|---|---|
| 6,088,160 A * | 7/2000 | Nomura | G02B 5/1852 359/566 |
| 9,964,760 B2 | 5/2018 | Pretorius | |

(Continued)

FOREIGN PATENT DOCUMENTS

| | | | |
|---|---|---|---|
| DE | 251719 A1 | 11/1987 | |
| DE | 10322587 A1 * | 1/2005 | ............. B24B 13/00 |

(Continued)

OTHER PUBLICATIONS

International Search Report rendered by the International Bureau of WIPO for PCT/EP2020/063695, dated Aug. 26, 2020, 2 pages.

(Continued)

*Primary Examiner* — Ephrem Z Mebrahtu
(74) *Attorney, Agent, or Firm* — Skaar Ulbrich Macari, P.A.

(57) ABSTRACT

An optical element held in a holder has a first optical surface which has no rotational symmetry with regard to its imaging axis. The holder has at least one reference element, which defines a position and/or orientation of the holder in a predefined coordinate system which compensates for a difference between an actual pose of the first optical surface and a target pose of the first optical surface in the holder at least in one degree of freedom. The reference element defines at least one specific azimuthal position of the holder. Also provided is a method for adjusting the holder of an optical element that has at least a first optical surface, which has no rotational symmetry with regard to its imaging axis, (Continued)

to a difference between an actual pose of the first optical surface and a target pose of the first optical surface in the holder.

19 Claims, 3 Drawing Sheets

(56) References Cited

U.S. PATENT DOCUMENTS

| | | | |
|---|---|---|---|
| 10,746,975 B2 | 8/2020 | Pretorius et al. | |
| 2013/0278911 A1 | 10/2013 | Limbach et al. | |
| 2017/0227747 A1 | 8/2017 | Zhou et al. | |

FOREIGN PATENT DOCUMENTS

| | | | |
|---|---|---|---|
| DE | 102008000558 A1 | 12/2008 | |
| DE | 102014012354 A1 | 2/2016 | |
| DE | 102015116895 B3 | 11/2016 | |
| DE | 102016014834 B3 | 4/2018 | |
| WO | 2007037691 A2 | 4/2007 | |

OTHER PUBLICATIONS

International Preliminary Report on Patentability rendered by the International Bureau of WIPO for PCT/EP2020/063695, dated Nov. 16, 2021, 9 pages.

Search Report for German Application No. 10 2019 115 544.4 rendered by the German Patent and Trade Mark Office on Feb. 12, 2020, 18 pages (including English translation).

\* cited by examiner

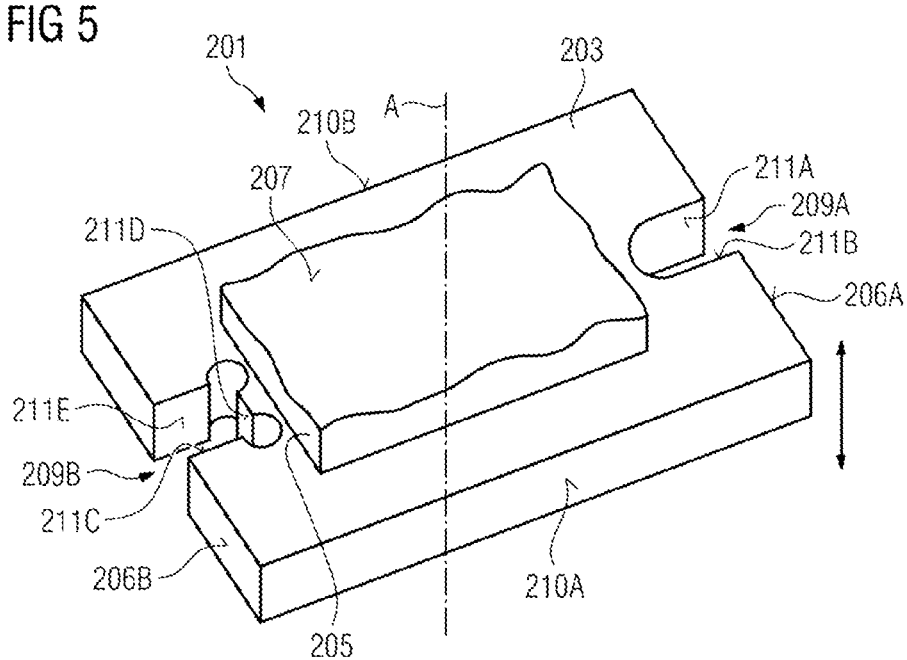
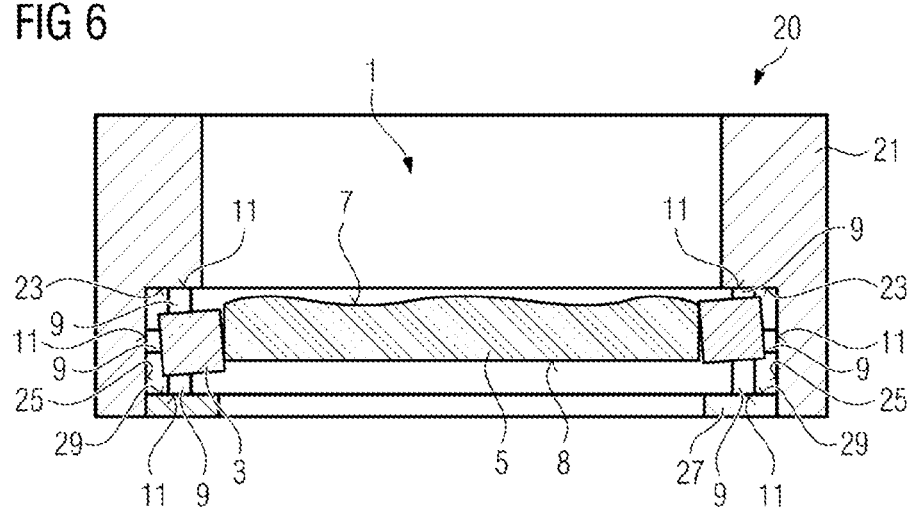

METHOD FOR ADJUSTING THE HOLDER OF AN OPTICAL ELEMENT HELD IN A HOLDER, OPTICAL COMPONENT AND OPTICAL ASSEMBLY

PRIORITY

This application claims the benefit of German Patent Application No. 10 2019 114 653.4, filed on May 31, 2019, and of German Patent Application No. 10 2019 115 544.4, filed on Jun. 7, 2019, wherein both of which are hereby incorporated herein by reference in their entirety.

FIELD

The present invention relates to a method for adjusting the mount of an optical element which is held in a mount and has at least one first optical surface without rotational symmetry in relation to an imaging axis of the optical element. Additionally, the invention relates to an optical component comprising a mount and an optical element which is held in the mount and has at least one first optical surface without rotational symmetry in relation to an imaging axis of the optical element, and to an optical assembly comprising at least one such optical component.

BACKGROUND

As a rule, optical elements such as lenses, mirrors, diffraction gratings or the like are held in a mount in order to be installed in an optical device with the mount. In this case, optical elements may also be constructed from two or more individual elements, wherein the connection may be established by way of an interlock, by way of friction or by way of integral bonding (adhesive bonding, cementing, etc.). In all cases, careful adjustment of the imaging axis or axes of the optical element or of the optical elements in relation to an imaging axis of the optical device is important in order to be able to obtain the required optical capability of the optical device to the best possible extent using the optical elements.

When the optical element is held in the mount, there may be minor deviations in the relative position and/or orientation of the optical elements in the mount on account of tolerances when producing the mount and/or tolerances when producing the optical element. When installed into a holding element of the optical device, this leads to a lack of correspondence between the imaging axis of the optical element and that of the optical device, reducing the imaging quality of the optical device. The deviations of the relative position and/or orientation of the optical element in the mount as a result of tolerances can be compensated by processing the mount for adjustment purposes following the insertion of the optical elements. During adjustment processing, the outer surfaces, as reference surfaces of the mount, are processed such that they define the relative position and/or orientation of the mount in a holding element when said mount is installed in the holding element of the optical device such that the relative position and/or the orientation of the imaging axis of the optical element held in the mount corresponds to the relative position and/or the orientation of the imaging axis of the optical device. In this way, it is possible to align held optical elements in an optical device very precisely in relation to the imaging axis of the device despite production-related tolerances during the production of the mount and/or during the production of the optical elements.

Examples of methods for adjustment processing of the mounts of held optical elements are described in DE 103 22 587 A1 and DE 10 2016 014 834 B3. Both documents describe centration turning methods, by means of which the outer side of a mount can be processed as a reference surface in such a way that its axis of symmetry is brought into correspondence with the optical axis of the held optical element. However, these centration turning methods only lead to mounts with reference surfaces in the form of a cylinder or an oblique cylinder, in which the outer surface of the lateral cylinder face or the end faces of the cylinder can serve as reference surfaces for accurately determining the relative position of the mounts in a holding element of an optical device.

SUMMARY

It is an object herein to provide a method for adjusting the mount of an optical element held in a mount, said method facilitating greater flexibility when compensating deviations of the relative position and/or the orientation of the optical surface of the held optical element from a target relative position and/or a target orientation. It is a further object herein to provide an advantageous optical element and an advantageous optical assembly.

A method is provided for adjusting the mount of an optical element which is held in a mount and has at least one first optical surface without rotational symmetry in relation to an imaging axis of the optical element, to a deviation of an actual pose of the first optical surface from a target pose of the first optical surface in the mount. Within the scope of the present invention, the term "pose" should be understood to mean the combination of position and orientation of an object, an optical surface in this case. Consequently, both the relative translational position of the optical surface and its rotational orientation in a specific coordinate system are uniquely defined by way of a specific pose of the optical surface. The target pose of the optical surface in the mount consequently specifies the target relative position and the target orientation of the optical surface in the mount. Accordingly, the actual pose specifies the actual relative position and the actual orientation of the surface in the mount, which may deviate from the target relative position and the target orientation.

The at least one optical surface can be a refractive optical surface, a reflective optical surface, a diffractive optical surface or a combination thereof. The not rotationally symmetric first optical surface may have what is known as shape rotational symmetry, that is to say the optical surface may by all means have rotational symmetry about an axis extending at an angle to the imaging axis but no rotational symmetry about the imaging axis. Examples of surfaces with shape rotational symmetry are toric surfaces or cylindrical surfaces, which have rotational symmetry rotational symmetry about an axis perpendicular to the imaging axis. The not rotationally symmetric first optical surface can however also be a surface without any rotational symmetry, in particular a free-form surface. A free-form surface is understood in the broader sense to be a complex surface that can be represented by piecewise functions. The piecewise functions can be—but need not be—continuous or continuously differentiable and, in particular, two times continuously differentiable.

Examples of piecewise functions are polynomial functions, including in particular polynomial splines, such as for example cubic splines, higher order splines of fourth order or higher, or polynomial non-uniform rational B-splines (nurbs). These are to be distinguished from surfaces with regular geometry such as for example spherical surfaces, aspherical surfaces, cylindrical surfaces and toric surfaces, which extend along a circular curve at least along a main meridian. In particular, a free-form surface need not have any axial symmetry and need not have any point symmetry. Free-form surfaces can be produced within the scope of CNC methods under numerical control on the basis of a mathematical description of the surface. However, it is also possible to produce free-form surfaces by means of blank pressing, for the purposes of which a negative mold with appropriate additions for temperature-dependent shrinkage is created by means of CNC methods.

The optical element and the mount need not necessarily be elements that are produced separately, that is to say the optical element need not be a part that is produced separately from the mount and fitted into the mount following production. The phrase according to which the "optical element is held in a mount", used above and below, instead also contains the option of the optical element and the mount being embodied as a component produced in one piece. By way of example, a plastic component comprising both a section representing the optical element with the first optical surface and a section representing the mount can be produced by means of injection molding. In this case, inaccuracies during the injection molding can lead to a deviation of the actual pose of the first optical surface from the target pose of the first optical surface. Likewise, in the case of a reflecting surface, for example, the first optical surface can be produced by processing the surface of a section of a metal blank, for example by milling, wherein the processed section forms the optical element and the non-processed section forms the mount. In this case, inaccuracies when processing the surface can lead to a deviation of the actual pose of the first optical surface from the target pose of the first optical surface.

The method according to certain embodiments comprises the steps of:
  specifying a target pose for the first optical surface in a given coordinate system;
  ascertaining the actual pose of the first optical surface in the given coordinate system; and
  ascertaining a change in the relative position and/or the orientation of the mount in the given coordinate system in such a way that a deviation of the actual pose of the first optical surface from the target pose of the first optical surface is compensated by changing the relative position and/or the orientation of the mount in the given coordinate system; and
  forming at least one reference element on the mount, said reference element defining a relative position and/or orientation of the mount which realizes the ascertained change.

The at least one reference element defines at least one specific azimuthal alignment of the mount in the given coordinate system. Here, an azimuthal alignment of the mount should be understood to mean a defined alignment of the mount in a plane perpendicular to the imaging axis of the optical element. The azimuthal alignment can be defined by an angle between a defined line of the mount and a defined direction of the coordinate system within the plane perpendicular to the imaging axis of the optical surface. The specified azimuthal alignment of the mount in the given coordinate system can be defined by virtue of, in particular, the reference element not being formed in rotationally symmetric fashion about the imaging axis of the first optical surface.

In the specified target pose it is also possible to consider relative position and/or orientation deviations of the superordinate assembly, into which the mount having the reference element should be installed. Such relative position and/or orientation deviations of the superordinate assembly, which may result for example from relative position and/or orientation deviations of interfaces of the superordinate assembly, may be ascertained by measurement and may be taken into account when calculating the target pose for the first optical surface. Expressed differently, the target pose need not necessarily reproduce the ideal relative position and orientation in accordance with the drawing. Instead, it can also consider a relative position and/or orientation which compensates relative position and/or orientation errors of the superordinate assembly in such a way that these errors are compensated by the target pose.

As a result of the at least one reference element defining at least one specific azimuthal direction of the mount in the given coordinate system, it is possible to define the orientation of the mount in comparison with the turned mounts, described at the outset, in a plane perpendicular to the imaging axis. Since the turned mounts are processed with the target of aligning the axis of symmetry of the mount with the imaging axis of the optical element, the resultant outer lateral face of the mount is rotationally symmetric about the imaging axis. Hence it is not possible to define a specific azimuthal alignment of the optical element. Therefore, the methods described at the outset cannot be used for unique adjustment processing of the mounts in the case of held optical elements where the azimuthal orientation in the beam path is important, as may be the case, for example, for toric surfaces, for cylindrical surfaces and in particular for free-form surfaces. By contrast, the method renders it possible to ensure a defined azimuthal orientation of the mount, as a result of which it is also possible to compensate a possible deviation between the target azimuthal orientation and the actual azimuthal orientation of the optical surface of a held optical element.

The at least one reference element can be formed, in particular, in such a way that it defines not only a specific azimuthal direction of the mount in the given coordinate system but a specific alignment of the mount in all three rotational degrees of freedom. The at least one reference element then facilitates a precise orientation of the optical surface of the held optical element in a holding element of an optical assembly. Moreover, the at least one reference element can be formed in such a way in a further configuration of the method that it defines a relative position of the mount in at least two translational degrees of freedom and in particular in all three translational degrees of freedom, in addition to the azimuthal alignment of the mount and optionally in addition to the alignment of the mount in all three rotational degrees of freedom. Here, the at least two translational degrees of freedom preferably are the translational degrees of freedom in a plane perpendicular to the imaging axis of the optical element. Particularly in the case of free-form surfaces, the quality of the effect obtained by the optical surface regularly depends significantly on the relative position of the optical surface in a plane perpendicular to the imaging axis. Therefore, already small errors when positioning the relative position within a surface perpendicular to the imaging axis can significantly impair the optical power of the held optical element in an optical device. With the aid of the described further configuration of the method it is possible to ascertain and by way of the at least one reference element define the change in the relative position and/or orientation of the mount in the given coordinate system such that a translational deviation of the actual relative position of the optical surface from the target relative position within a plane perpendicular to the imaging axis is compensated.

In the further example configuration described, the method can in particular also be configured in such a way that the deviation of an actual pose from a target pose of the optical surface can be compensated in all six degrees of freedom by means of a change in the relative position and/or orientation of the mount.

Ascertaining the change in the relative position and/or the orientation of the mount can be implemented by adjusting the actual pose of the first optical surface to the target pose of the first optical surface. The change in the actual pose of the first optical surface, which arises from adjusting the actual pose to the target pose of the first optical surface, then represents the change in the relative position and/or in the orientation of the mount. In this case, the target pose of the first optical surface can be given by the relative position of a number of target surface points in the given coordinate system. Then, the respective relative position in the given coordinate system is captured by measurement for a number of surface measurement points on the first optical surface. Then, the ascertained relative positions of the surface measurement points represent the actual pose of the first optical surface. Then, the actual pose of the first optical surface is adjusted to the target pose of the first optical surface by adjusting the relative position of the surface measurement points to the relative position of the target surface points. The relative position of the surface measurement points in relation to one another is not altered when adjusting the relative position of the surface measurement points to the relative position of the target surface points. The capture of the relative position of the at least three surface measurement points in the given coordinate system by measurement can be implemented by pointwise measurement, by line-by-line measurement or by two-dimensional measurement. By way of example, wavefront sensors, photogrammetry or reflectometry can be used for the two-dimensional measurement. The described configuration of the method facilitates the ascertainment of the change in the relative position and/or the orientation of the mount using conventional algorithms for adjusting the actual pose to the target pose of the optical surface, wherein the necessary computational complexity—but as a rule also the precision of the adjustment—increases with the number of measurement points. A suitable number of surface measurement points and target surface points can be chosen depending on the available computational power and the required precision.

In particular embodiments, the following steps can be carried out to adjust the relative position of the surface measurement points to the relative position of the target surface points:

specifying a target function which represents a measure for the global deviation of the relative position of the surface measurement points from the relative position of the target surface points; and changing the relative position of the surface measurement points while maintaining their relative position with respect to one another with the aid of rigid transformations until the target function satisfies a termination criterion.

By way of example, reaching a minimum of the target function, dropping below a specified limit of the target function or reaching a certain number of iterations can serve as a termination criterion.

In a special configuration example, a check is carried out for each surface measurement point as to whether it satisfies a given quality criterion. A possible quality criterion would be the maximum distance of a surface measurement point from the target surface. Measurement outliers can be eliminated as a result. Then, only the surface measurement points that satisfy the quality criterion are considered for adjusting the relative position of the surface measurement points to the relative position of the target surface points. This can ensure that sufficiently good measurement data are available for carrying out the optimization. If the surface measurement points are captured optically by way of scanning the first optical surface by means of a light beam, a check of the signal intensity of the light reflected by the first optical surface can be used as an additional or alternative quality criterion. In this case, a lower threshold can be defined for the signal intensity, said lower threshold having to be reached or exceeded in order to qualify the reflected light as a valid signal. The threshold can be determined taking into account the maximum expected inclination of surface regions of the first optical surface and the maximum expected distance of surface regions of the first optical surface from the utilized sensor.

Moreover, the set of the surface measurement points can be masked such that only those surface measurement points which are located in a region of the surface relevant to the sought-after optical effect of the surface are still considered for adjusting the actual pose to the target pose. As a result, shape errors of the surface outside of the relevant optical region (e.g., polishing overrun) cannot falsify the actual pose and/or the computational outlay is reduced.

In particular, ascertainment of the change in the relative position and/or the orientation of the mount can be implemented iteratively within the scope of the method. This offers the option of repeating the method until a sufficiently good compensation of the deviation of the actual pose from the target pose of the first optical surface is obtained or until there is a sufficiently good adjustment of the actual pose to the target pose of the first optical surface. Within the scope of this iterative ascertainment of the changes in the relative position and/or orientation of the mount, or of the adjustment of the actual pose to the target pose, meeting the quality criterion for the considered surface measurement points can optionally be rechecked at least once. Then, only the surface measurement points that satisfy the quality criterion again are still considered going forward from the following iteration step. This can avoid measurement points that are too inaccurate from preventing the arrival at a better compensation of the deviation of the actual relative position from the target relative position of the first optical surface or the arrival at a better adjustment of the actual pose to the target pose.

Within the scope of certain embodiments of the method, forming the at least one reference element on the mount can be implemented by subtractive processing and/or additive processing of the mount. In this case, the subtractive processing can be in particular machining or beam/jet-based processing. For additive processing, use can be made in particular of coating methods or additive manufacturing, that is to say a method in which a workpiece is constructed layer-by-layer from shapeless or shape-neutral material using physical and/or chemical effects. The subtractive and/or additive processing of the mount can be implemented under CNC control by means of a processing apparatus having at least three positioning axes. In this case, the three positioning axes can comprise, in particular, at least one rotational positioning axis and two translational positioning axes. As a result, it is possible for example to realize subtractive and/or additive processing in such a way that it is possible to reach a defined relative position in two translational degrees of freedom in addition to the defined azimuthal relative position. As a result of not only subtractive processing but also additive processing being used, there is significantly greater freedom in the creation of the reference elements than in the case of the centration turning described at the outset.

If the optical element has at least one second optical surface which may be rotationally symmetric or non-rotationally symmetric and which has a target pose in the given coordinate system, it is possible to implement an adjustment of the mount both to the deviation of the actual pose of the first optical surface from the target pose of the first optical surface in the mount and to a deviation of the actual pose of the second optical surface from the target pose of the second optical surface in the mount. Since the deviation of the actual pose of the first optical surface from the target pose of the first optical surface as a rule does not correspond to the deviation of the actual pose of the second optical surface from the target pose of the second optical surface, the change in the relative position and/or the orientation of the mount in the given coordinate system for the purposes of compensating the deviations is usually overdetermined. In the case of an overdetermined change in the relative position and/or the orientation of the mount in the given coordinate system, a uniquely determined change in the relative position and/or the orientation can be ascertained by curve fitting. In this way it is possible to obtain an optimal compromise for simultaneously compensating a deviation of the actual pose from the target pose of the first optical surface and a deviation of the actual pose from the target pose of the second optical surface. If the second optical surface is rotationally symmetric about its imaging axis, there is no overdetermination in the azimuthal alignment, and so curve fitting then is not required in respect of the azimuthal alignment.

An optical component according to certain embodiments can comprise a mount and an optical element which is held in the mount and which has at least one first optical surface, the latter being able to be a refractive optical surface, a reflective optical surface, a diffractive optical surface or a combination thereof. In relation to an imaging axis of the optical element, the first optical surface has no rotational symmetry, wherein it can be formed in particular as a free-form surface but also as a surface with shape rotational symmetry. The mount has at least one reference element which defines a relative position and/or an orientation of the mount in a given coordinate system, which compensates a deviation in at least one degree of freedom of an actual pose of the first optical surface from a target pose of the first optical surface in the mount. In this case, the at least one reference element defines at least one specific azimuthal relative position of the mount. The at least one reference element of the mount thus allows the optical component to be inserted in a holding element of an optical assembly in such a way that at least the deviation of the actual azimuthal orientation of the optical surface from its target azimuthal orientation is compensated by the relative installation position of the mount in the holding element, and so the held optical element has at least a defined azimuthal alignment in the optical assembly following the installation in the optical assembly.

If the at least one reference element defines a specific alignment of the mount in all three rotational degrees of freedom, it is possible to obtain such an orientation of the mount in the holding element that a deviation of the actual orientation from the target orientation of the optical surface is compensated in all three rotational degrees of freedom.

Furthermore, it is possible that the at least one reference element defines a specific relative position of the mount in at least two translational degrees of freedom in addition to the at least azimuthal relative position or in addition to the specific alignment of the mount in all three rotational degrees of freedom. Two of the at least two translational degrees of freedom preferably lie in a plane perpendicular to the imaging axis of the optical element. Particularly in the case of free-form surfaces, this allows translational deviations of the actual relative position from the target relative position within a plane perpendicular to the imaging axis to be compensated by an appropriate positioning of the mount in the holding element. Since free-form surfaces frequently react very sensitively to incorrect positioning within a plane perpendicular to the optical axis, this can realize a high optical quality of the held optical element with a free-form surface upon installation in an optical assembly.

Moreover, the at least one reference element can be formed in such a way that it allows a displacement of the mount along a defined direction. As a result, it is possible to provide held reference elements in which the optical effect can be influenced in a targeted manner by displacing free-form surfaces relative to one another. Here, the defined direction preferably lies within a plane perpendicular to the imaging axis of the optical element. Such optical elements, known as Alvarez elements, are described for example in WO 2007/037691 A2, in US 2017/0227747 A1 and in US 2013/0278911 A1. With the aid of Alvarez elements it is possible to correct for example aberrations for different focal planes in a targeted manner, as is described in DE 10 2013 101 711 A1. In addition, optical elements with free-form surfaces that are displaceable perpendicular to the optical axis also offer the possibility of deliberately introducing aberrations into an optical system, for example to bring about a soft focus effect in a photo lens, as is described in DE 10 2014 118 383 A1, for example. A similar use of optical elements with free-form surfaces that are displaceable perpendicular to the optical axis is also described in DE 10 2015 116 895 B3. As an alternative to the Alvarez elements, the defined direction can also lie in the direction of the imaging axis. In particular, this facilitates zoom functionalities.

An optical assembly according to certain example embodiments comprises at least one optical component and a holding element which holds and adjusts the at least one optical component, wherein the at least one reference element of the mount of the optical component interacts with the holding element in such a way for adjustment purposes that a defined relative position and/or orientation of the first optical surface in relation to the holding element is created. As a result, it is possible, in a targeted fashion, to align the optical element held by the holding element such that the optical surface of said optical element adopts a defined pose within the optical assembly that does not deviate from the target pose.

Further features, properties and advantages of the present invention will become apparent from the following description of exemplary embodiments with reference to the accompanying figures.

BRIEF DESCRIPTION OF THE DRAWINGS

FIG. 5 shows a third exemplary embodiment of an optical component with a held optical element.

FIG. 6 shows an exemplary embodiment of an optical assembly with an optical component which comprises a held optical element.

Figure 1:
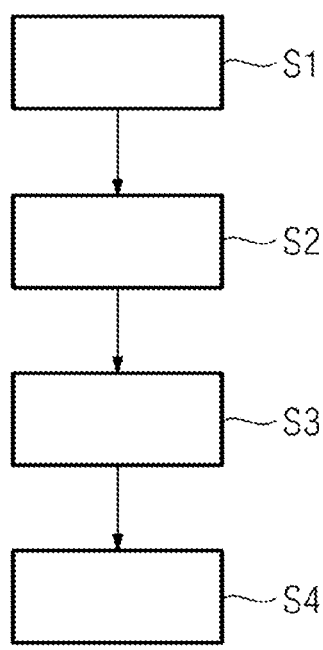
FIG. 1 elucidates, in the form of a flowchart, an exemplary embodiment for adjusting the mount of an optical element held in a mount to a deviation of an actual pose of the optical surface thereof from a target pose.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

An exemplary embodiment of the method according to the invention for adjusting the mount of a held optical element to a deviation of an actual pose of an optical surface of the optical element from a target pose of the optical surface is described below with reference to FIGS. 1 and 2, wherein FIG. 2 describes the process for ascertaining a change in relative position and/or the change in orientation of the mount for the purposes of compensating the deviation of the actual pose from the target pose used in the present embodiment.

The optical surface is an optical surface without rotational symmetry about the imaging axis. The imaging axis of the optical surface is given by the chief ray direction which is of a beam passing through the optical surface and which is given by the imaging function sought after by way of the optical surface. In particular, the optical surface can be a surface with shape rotational symmetry, the axis of symmetry of which has an angle with respect to the imaging axis, typically a right angle with respect to the imaging axis. Examples of such surfaces are toric surfaces or cylindrical surfaces. As an alternative thereto, the optical surface can be formed as a free-form surface which is typically neither point nor axially symmetric.

Parts of the method according to the invention are preferably carried out on a computer or a computing unit specifically designed to carry out the method. In particular, the computer or the computing unit can be part of a CNC-controlled processing machine used to process the mount in order to process the mount in terms of the deviation of the actual pose from the target pose.

In a first step S1 of the method, the target pose of an optical surface of the held optical element is specified in a given coordinate system, in which the relative position and the orientation of the mount are also specified. In this case, the target pose can be specified by specifying, in the given coordinate system, the relative spatial positions of a number of target surface points that represent the optical surface. In this case, the relative positions of at least three target surface points are required in order to be able to uniquely specify both the relative translational position and the orientation of the optical surface in the given coordinate system. The target pose, that is to say the target relative position and the target orientation, of the optical surface can be readily ascertained from the relative positions of the target surface points in relation to the origin of the given coordinate system if the relative positions of the target surface points are also known in relation to the optical surface. In this case, it is not necessary for the target surface points to really be points on the optical surface self; instead, all that is required is that the relative positions of actual points lying on the optical surface can be ascertained with knowledge of the relative position of the target surface points. By way of example, the optical surface can be described in a coordinate system coupled to the optical element. In this case, the target surface points could be any points in the coordinate system coupled to the optical element, the relative position and orientation of said points being known in relation to the given coordinate system. The coordinates of points of the optical surface given in the coordinate system coupled to the optical element can then be transformed into coordinates of the given coordinate system by means of a coordinate transformation. However, a different path is chosen in the present exemplary embodiment. In the present exemplary embodiment, the respective relative spatial position is specified for a large number of target surface points that are located on the optical surface, and so the target surface points represent a point cloud model of the optical surface in the target pose.

To ascertain the actual pose of the optical surface, the relative spatial positions of a number of surface measurement points are ascertained in the given coordinate system in step S2. The actual relative position and the actual orientation of the optical surface can already be ascertained in the given coordinate system from the captured relative positions of three surface measurement points in the given coordinate system provided the relative position of the surface measurement points on the optical surface is known. However, a different path is chosen in the present exemplary embodiment. To ascertain the actual pose of the optical surface, the relative spatial positions of a large number of surface measurement points are captured by measurement such that the relative positions of the surface measurement points form a point cloud model of the optical surface in the given coordinate system provided they are captured at a high enough density.

The surface measurement points can be captured by point-by-point capture of surface measurement points, by line-by-line capture of surface measurement points or by two-dimensional capture of surface measurement points. By way of example, the point-by-point capture of surface measurement points can be implemented by means of multi-wavelength interferometers, by means of chromatic sensors, by means of triangulation sensors, by means of tactile sensing devices, by means of confocal sensors, etc., while surface points can be captured line-by-line by means of, e.g., a linear scanner or the like. Interferometric methods or wavefront sensors can be used for the two-dimensional capture of surface measurement points. Alternatively, there is the option of capturing surface measurement points in two-dimensional fashion by means of a structured light method. In this case, patterns of parallel bright and dark strips with different widths are projected onto the optical surface sequentially in time and are recorded by at least two observation cameras. Then, the relative positions of the surface measurement points can be calculated from the recorded images of the projected patterns. A further example for capturing surface measurement points in two dimensions is projecting a stripe pattern with sinusoidal intensity distributions on a diffusing panel and mirroring the pattern by the optical surface. The pattern mirrored by the optical surface is recorded by at least one camera, wherein the relative positions of surface measurement points can be calculated from the distortion of the pattern in the recorded image. In particular, two or more of the described capture processes can also be used to capture the relative positions of surface measurement points. By way of example, different methods can be carried out from opposite sides of the held optical element.

The chosen method for capturing the relative positions of the surface measurement points can be carried out, in particular, by a processing machine subsequently used to form the at least one reference element on the mount. In this case, the given coordinate system can be the coordinate system of the machine such that the capture of the surface measurement points and the subsequent processing of the mount are implemented in the same coordinate system. By contrast, if the surface measurement points are captured by means of an apparatus that is separate from the processing machine, coordinate transformation still is required before the processing of the mount. If reference is made to a given coordinate system within the scope of the present invention, this therefore does not necessarily mean that all steps of the method are carried out in the same coordinate system. However, it is mandatory for the coordinates of the used coordinate systems to be convertible into one another by way of a known coordinate transformation. Within this meaning, a given coordinate system should also be understood to mean a group of coordinate systems which can be converted uniquely into one another by way of coordinate transformations.

Within the scope of capturing the surface measurement points, it is sufficient, as a matter of principle, to capture the relative position of surface measurement points only for a portion of the optical surface. However, it is also possible to ascertain the relative position of surface measurement points for the entire optical surface or for a plurality of portions of the optical surface.

After the target pose of the optical surface has been specified in step S1 by virtue of a point cloud model representing the optical surface in its target pose being present as a result of specifying the relative spatial positions of a number of target surface points and after the relative positions of surface measurement points have been captured at a high enough density in step S2 such that a point cloud model which represents the actual pose of the optical surface in the given coordinate system of the optical surface is present, a change in the relative position and/or the orientation of the mount is ascertained in step S3 in such a way that a deviation of the actual pose of the optical surface from the target pose of the optical surface is compensated for at least in one degree of freedom by changing the relative position and/or orientation of the mount in the given coordinate system. Preferably, such a change in the relative position and/or orientation of the mount in the given coordinate system is ascertained that the complete actual orientation of the optical surface is adjusted to the target orientation by way of the change in the relative position and/or orientation of the mount. Moreover, it is advantageous if the change in the relative position and/or orientation of the mount is also implemented in such a way that, moreover, the actual relative translational position of the optical surface is adjusted to the target relative translational position of the optical surface in at least two translational degrees of freedom. In particular, an adjustment in all three translational degrees of freedom is also possible. In the case of optical elements with free-form surfaces, it may however be advantageous if the adjustment is only implemented in two translational degrees of freedom with, for example, the relative translational position not being defined in a direction perpendicular to the imaging axis. This allows held optical elements with free-form surfaces to be displaced relative to one another perpendicular to the imaging axis in order thereby to realize different optical effects of the optical elements.

The ascertainment of the change in the relative position and orientation of the mount required to compensate a deviation of the actual pose of the optical surface from the target pose of the optical surface is described below with reference to FIG. 2.

In a first step of ascertaining the change in the relative position and/or the orientation of the mount, a check is carried out as to which of the captured surface measurement points of the point cloud model representing the optical surface in an actual pose meet a given quality criterion (step S31). Only those surface measurement points that satisfy the given quality criterion are used in the further course of the method. In the present exemplary embodiment, the point cloud model which is formed by the utilized surface measurement points and which represents the optical surface in the actual pose is iteratively approximated by means of rigid transformations to the point cloud model which is formed by the target surface points and which represents the optical surface in the target pose until an optimized rigid transformation, the execution of which leads to the value of a target function satisfying a given termination criterion, has been found (step S32). In this case, a rigid transformation is a transformation which only changes the pose of the point cloud model, i.e., only the relative translational position and the orientation of the point cloud model, without altering the distances between the points in the point cloud model. Such a procedure is known as point set registration or else as point mapping. The target function represents a measure for the global deviation of the relative positions of the surface measurement points which form the point cloud model of the optical surface in the actual pose from the relative positions of the target surface points which form the point cloud model of the optical surface in the target pose. By way of example, the termination criterion for the target function can be the reaching of a minimum of the target function. Alternatively, there is the option of specifying a maximum admissible value for the target function and terminating the optimization when this maximum admissible value is reached or undershot, or of specifying a maximum number of iterations and terminating the optimization once the maximum number of iterations has taken place.

After each rigid transformation carried out in step S32, a check is carried out in step S33 as to whether the value of the target function satisfies the termination criterion. If the value of the target function does not satisfy the termination criteria, the method returns to step S32 and carries out a renewed transformation. Instead of returning to step S32, the method can also return to step S31, as is indicated in FIG. 2 by the dashed arrow. In this case, the utilized surface measurement points are checked again in respect of whether they meet the quality criterion. Only those surface measurement points which also still satisfy the quality criterion are can considered during the renewed transformation and the renewed calculation of the value of the target function. In particular, the method can be designed such that the quality criterion is only rechecked after a certain number of iteration steps. Should it emerge that the termination criterion of the target function still has not been reached even after a certain number of iterations, it is possible to use a stricter version of the quality criterion in order to increase the demands on the surface measurement points used during the iteration.

If the value of the target function is determined as satisfying the termination criterion in step S33, the method proceeds to step S34, in which at least one numerical model is constructed for at least one reference element to be formed on the mount, said reference element defining the optimized rigid transformation obtained by the iterative method, that is to say leading in conjunction with a reference surface in a holding element of an optical assembly to the mount being positioned and/or oriented in the optical assembly in a manner corresponding to the optimized rigid transformation. A reference element which has no rotational symmetry in relation to the imaging axis is constructed as the at least one reference element. In particular, the reference element is designed such that it specifies a defined azimuthal orientation of the mount in the given coordinate system such that a given azimuthal orientation of the mount, and hence of the optical surface of the held optical element upon installation in the optical assembly, can be realized with the aid of the reference element.

In the present exemplary embodiment, the surface can be masked on the surface region relevant to the sought-after optical effect of the surface, from the start or after a certain number of iterations. In practical terms, this is implemented by virtue of the set of surface measurement points being restricted to that subset of surface measurement points which only still contains surface measurement points located in the surface region relevant to the sought-after optical effect of the surface. For adjusting the actual pose to the target pose, only the surface measurement points from the subset of surface measurement points are then still considered in the subsequent iterations. As a result, shape errors of the surface outside of the relevant optical region (e.g., polishing overrun) cannot falsify the actual pose and/or the computational outlay is reduced.

Figure 2:
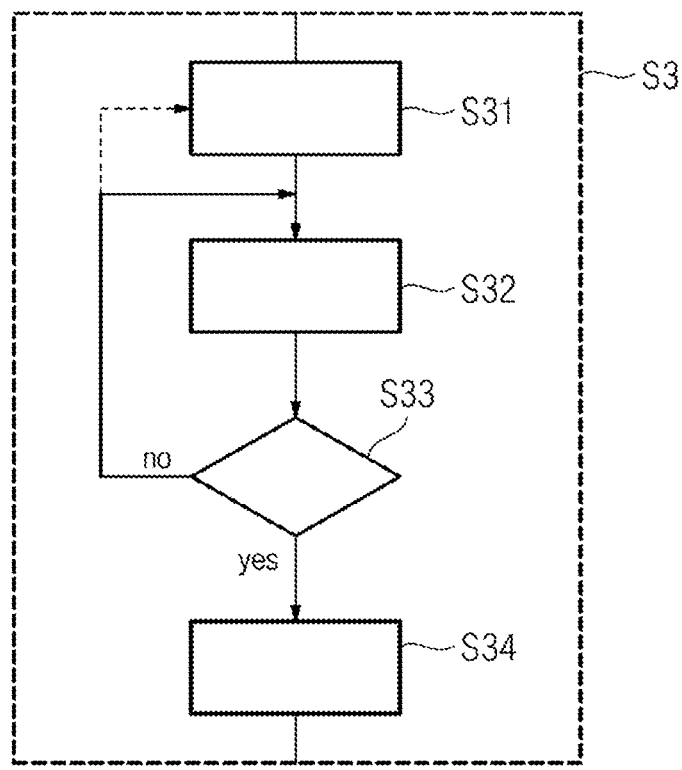
FIG. 2 shows a detail of FIG. 1 in the form of a flowchart.

Step S34 ends step S3 of FIG. 1. The method shown in FIG. 1 then proceeds to step S4, in which the at least one reference element constructed in step S34 is formed on the mount of the optical element by means of subtractive and/or additive processing of the mount.

In the exemplary embodiment of the present invention, the at least one reference element is formed by machining, that is to say only by subtractive processing of the mount. In this case, it may be advantageous if the mount has an excess prior to processing such that ablation on one side can be compensated for by an omitted ablation on the other side. Milling is used as machining method in the present exemplary embodiment. Milling is implemented under CNC control, wherein use is made of a processing machine having at least two translational and one rotational positioning axis, with the aid of which a held optical element can be positioned in the machine under numerical control.

Even though the described exemplary embodiment of the method according to the invention contains only a single optical surface for which a deviation of the actual pose from the target pose should be compensated by a change in the relative position and/or orientation of the mount, the method can also be used to compensate the actual poses in relation to the target poses for a plurality of optical surfaces, in particular also a front surface and a back surface of the optical element. Since the deviations of the actual poses from the target poses may be different for the different optical surfaces, it may be the case that the optimized rigid transformation is overdetermined, that is to say that different optimized rigid transformations are available for the optical surfaces. Curve fitting can be used to nevertheless obtain a unique result. By way of example, the latter can be designed such that an averaged optimized rigid transformation is obtained from the optimized rigid transformations, wherein weighted averaging may also take place. In this case, the weights can be coupled for example to the respective significance of the contributions of the individual optical surfaces to the imaging quality. However, it is also possible to integrate the compensation into the target function, for example by virtue of the deviations of the relative positions of the surface measurement points from the relative positions of the target surface points being included in the target function by way of a multiplication factor for at least one of the optical surfaces. What this can achieve, for example, is that in the iteration for finding the optimized rigid transformation described with reference to FIG. 2, greater deviations of the relative positions of the surface measurement points from the relative positions of the target surface points are allowed for one optical surface than for another optical surface.

A non-comprehensive representation of exemplary embodiments for held optical elements in which the mount has at least one reference element, by means of which the mount can be oriented in a holding element of an optical assembly in such a way that at least one azimuthal deviation of the actual pose of the optical surface of the held optical element from its target pose is compensated, is described below with reference to FIGS. 3 to 5.

Figure 3:
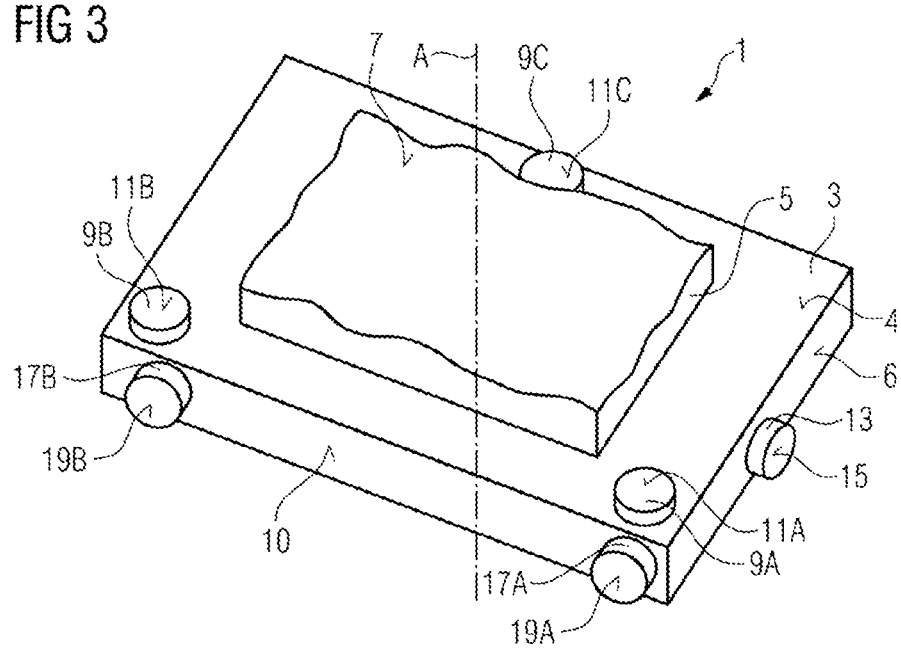
FIG. 3 shows a first exemplary embodiment of a component with a held optical element.

FIG. 3 shows a first exemplary embodiment of an optical component 1 according to the invention, with a mount 3 that is rectangular in the present exemplary embodiment and with an optical element 5 which is held in the mount 3 and is likewise rectangular in the present exemplary embodiment. As an optical surface 7, the optical element 5 has a free-form surface which has neither point nor axial symmetry. The optical component illustrated in FIG. 3 has a number of reference elements 9A to 9C, 13, 17A and 17B which in the present exemplary embodiment have end faces designed as abutment surfaces 11A to 11C, 15, 19A and 19B. With the abutment surfaces 11A to 11C, 15, 19A and 19B, the reference elements 9A to 9C, 13, 17A and 17B abut against reference surfaces 23, 25 of the holding element upon installation in a holding element 21 of an optical assembly 20 (cf. FIG. 6), as a result of which they define the relative position and orientation of the mount 3 in the holding element 21, and hence in the optical assembly 20.

The distance of the reference elements 9A to 9C from the surface 4 of the mount 3 defines the relative position of the mount 3 along the imaging axis A in the present exemplary embodiment, and the inclination of the abutment surfaces 11A to 11C relative to the surface 4 defines the orientation of the mount 3 in two rotational degrees of freedom. In this case, the inclinations of the abutment surfaces 11A to 11C are identical in the present exemplary embodiment so that they can interact with the same plane reference surface. In the case of non-planar reference surfaces or if the abutment surfaces 11A to 11C should interact with different reference surfaces, the abutment surfaces 11A to 11C may also have different inclinations from one another relative to the surface 4, depending on the orientation of the reference surface with which an abutment surface interacts. In the present exemplary embodiment, only the azimuthal orientation of the mount 3 in relation to the imaging axis A is defined by the abutment surfaces 11A to 11C.

A further reference element 13 is found on one of the short peripheral surfaces 8 of the mount 3. As in the other reference elements, its abutment surface 15A abuts against a reference surface 23, 25 of the holding element 21 of the optical assembly 20. In this case, the distance of the abutment surface 15A from the short peripheral surface 8 defines the position of the mount 3 in the holding element in a first direction perpendicular to the imaging axis A. Two further reference elements 17A, 17B with abutment surfaces 19A, 19B are situated on one of the long peripheral surfaces 10 of the mount 3. With the aid of the distance of their abutment surfaces 19A, 19B from the long peripheral surface 10, these define the position of the mount 3 in the holding element in a second direction perpendicular to the imaging axis A. Moreover, the azimuthal orientation of the mount 3 about the imaging axis A is defined by an inclination of the abutment surfaces 15, 19A, 19B of the reference element 13 and the reference elements 17A and 17B. In this case, the inclinations of the surfaces 15, 17A and 17B required to define the azimuthal orientation in each case depend on the orientations of the reference surfaces against which they abut.

To produce an optical component 1, as shown in FIG. 3, material is ablated under numerical control from a rough version of the mount 3 of the held optical element 7 with larger dimensions than required for the installation in the holding element 21 of the optical assembly 20, in such a way that the mount 3 with the reference elements 9A to 9C, 13, 17A and 17B remains. In this case, the shape of the reference elements arises from the optimized rigid transformation in conjunction with the relative position and orientation of the reference surfaces 23, 25 in the holding element 21.

Figure 4:
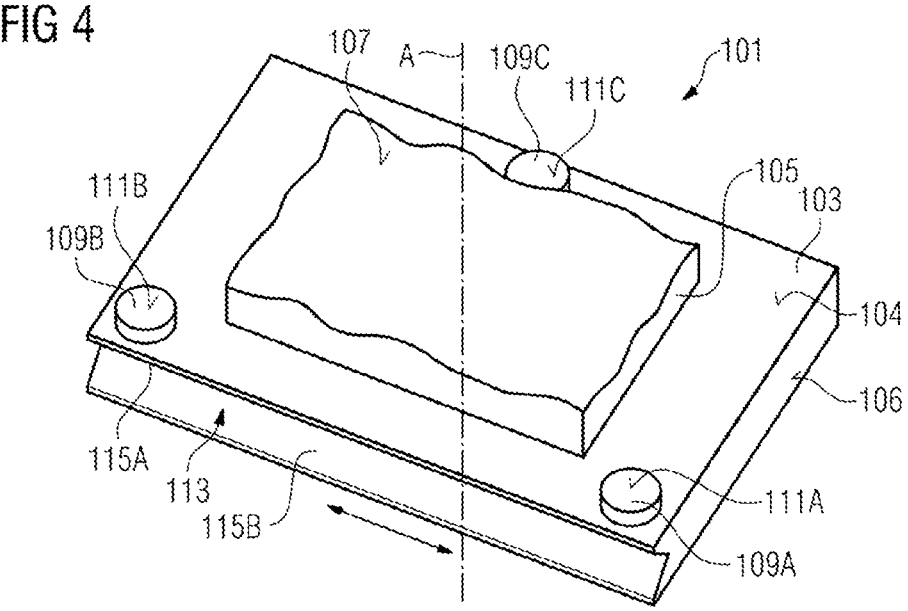
FIG. 4 shows a second exemplary embodiment of an optical component with a held optical element.

A second exemplary embodiment of an optical component 101 according to the invention is illustrated in FIG. 4.

The optical component of FIG. 4 has a rectangular mount 103 and a rectangular optical element 105 which has a free-form surface 107 and is held in the mount, like the optical component of FIG. 3. Moreover, the upper side 104 of the mount 103 contains three reference elements 109A, 109B and 109C with abutment surfaces 111A, 111B and 111C, which correspond in terms of their function and design to the reference elements 9A, 9B and 9C of FIG. 3. The optical element 105, too, corresponds to the optical element 5 of FIG. 3. The optical component 101 illustrated in FIG. 4 differs from the optical component 1 illustrated in FIG. 1 by the lack of the cylindrical reference elements on the long peripheral surface. Instead, a reference element in the form of a groove 113 with a V-shaped cross section is formed in at least one of the long peripheral surfaces in the present exemplary embodiment. In this case, the wall surfaces 115A, 115B of the groove 113 define abutment surfaces which interact with the surfaces of a projection with a roof-shaped cross section formed in the holding element of an optical assembly. The surfaces with the roof-shaped cross section represent reference surfaces of the holding element in this exemplary embodiment. As a result of the interaction of the wall surfaces 115A, 115B of the groove 113 with these reference surfaces, the relative position of the mount 103 is defined along the imaging axis A and along a direction perpendicular to the imaging axis A and perpendicular to the direction of longitudinal extent of the groove. Moreover, the configuration of the groove also defines the orientation of the mount 103. To define the azimuthal orientation, the groove can reach deeper into the material of the mount 103 at its one end than at its other end. The groove extends in a linear fashion between the two ends, and so the longitudinal direction of the groove defines an azimuth angle of the mount.

In the present exemplary embodiment, the wall surfaces 115A, 115B of the groove 113 serve as sliding surfaces which can slide relative to the engaging roof-shaped projection of the holding element. As a result, it is possible to displace and position the mount 103 along the direction of extent of the groove in a targeted manner by means of a suitable drive, as is indicated in FIG. 4 by a double-headed arrow.

Like in the production of the optical component 1 shown in FIG. 3, the optical component 101 can be produced by subtractive processing of the mount 103.

A third exemplary embodiment of an optical component according to the invention is illustrated in FIG. 5. Like the previous exemplary embodiments, the optical component 201 of the third exemplary embodiment comprises a rectangular mount 203 with a rectangular optical element 205 which is held therein and has a free-form surface 207 as an optical surface. Five abutment surfaces 211A to 211E are present in the mount and formed in cutouts 209A, 209B of the mount 203. Adjustment projections of a holding element of an optical assembly which provide adjustment surfaces engage in the cutouts 209A, 209B in such a way that the abutment surfaces 211A to 211E abut against the adjustment surfaces. The relative position of the mount 203 along a first direction perpendicular to the imaging axis A is in this case defined by the distance of the abutment surface 211D from the short peripheral surface 106B. The relative position of the mount 203 along a second direction perpendicular to the first direction and perpendicular to the imaging axis A is defined by the position of the cutouts 209A, 209B between the two long peripheral surfaces 210A, 210B of the mount 203. In the present exemplary embodiment, the cutouts 209A, 209B are largely located centrally between the two long peripheral surfaces 210A, 210B; however, they could also be located closer to one of the long peripheral surfaces than to the other long peripheral surface, which would define a different position of the mount along a direction parallel to the longitudinal extent of the short peripheral surfaces. Moreover, the positions of the cutouts 209A, 209B between the two long peripheral surfaces 210A, 210B also define the azimuthal orientation of the mount 203 about the imaging axis A in the present exemplary embodiment. By way of example, the cutout 209A could be displaced toward one of the two long peripheral surfaces, whereas the cutout 209B is displaced to the other of the two long peripheral surfaces, with the inclination of the abutment surfaces 211A to 211E being altered in such a way that the adjustment projections can still engage in the cutouts 209A, 209B. As a result, the abutment surfaces 211A to 211E in conjunction with the adjustment surfaces of the adjustment projections of the holding element would yield a different azimuthal orientation of the mount 203.

If the adjustment projections of the holding element of the optical assembly have a greater extent than the mount along the direction of extent of the imaging axis, the cutouts 209A, 209B facilitate a displacement of the optical component along the adjustment projections which are guided in the cutouts. The mount 203, and hence the optical element 205, can then be displaced and positioned in a targeted fashion along the imaging axis A by means of a suitable drive, as is indicated in FIG. 5 by a double-headed arrow.

An exemplary embodiment of an optical assembly according to the invention is described below with reference to FIG. 6. The figure shows an optical assembly 20 with a holding element 21 and an optical component 1 that is held by the holding element 21. The optical component 1 contains an optical element 5 which has a free-form surface 7 as an optical surface and is held in the mount 3. In the present embodiment, the back surface 8 of the optical element 5 is embodied as a plane surface. On account of tolerances the optical element 5 is slightly tilted in relation to its mount 3, and so the actual pose of the free-form surface 7 and the actual pose of the plane surface 8 in the mount 3 deviate from their target poses in the mount 3. The mount 3 is therefore provided with reference elements which define a specific relative position and orientation of the mount 3 in the holding element 21. To this end, the holding element 21 has adjustment surfaces 23, 25 with which the abutment surfaces 11 of the reference elements 9 interact in order to define the relative position and the orientation of the mount 3 in the holding elements 21. Moreover, the holding element 21 comprises a fixation part 27, which is used to fix the mount 3 in the holding element and which likewise has an adjustment surface 29 which interacts with abutment surfaces 11 of the reference elements 9. The deviation of the actual poses of the free-form surface 7 and of the plane surface 8 from their respective target poses can be compensated for with the aid of the interaction of the reference elements 9 with the adjustment surfaces 23, 25, 29 of the holding element 21 and of the fixation part 27. If the deviations of the actual poses from the target poses are not identical for the free-form surface 7 and the plane surface 8 on account of manufacturing tolerances, a compensation is implemented such that the best optical result can be obtained. Such a compensation can be implemented by means of the curve fitting described in relation to the method according to the invention.

The present invention has been described in detail on the basis of exemplary embodiments for explanatory purposes. However, a person skilled in the art recognizes that there can be deviations from the exemplary embodiments within the scope of the present invention. Thus, the not rotationally symmetric optical surface need not be a free-form surface, but it can be a different surface which has no rotational symmetry about the imaging axis A. Moreover, the reference elements need not have the shape shown in the exemplary embodiments. All that is important is that they are suitable for uniquely defining at least the azimuthal orientation of the optical surface in relation to the imaging axis. Furthermore, deviating from the illustrated embodiments, the mount can have a different shape to a rectangular one. In particular, the mount could also have a round shape, wherein the reference elements could then be realized, for example, in the form of cutouts in the style of the cutouts illustrated in FIG. 5. Other geometric shapes of the mounts and of the optical elements can also be considered as a matter of principle, with there being no restrictions at all in respect of the shape. Likewise, the profile of the groove shown in FIG. 4 can deviate from the profile shown, or a plurality of grooves may be present in the same surface or in surfaces facing away from one another. A person skilled in the art recognizes that numerous further developments of the illustrated exemplary embodiments are possible within the scope of the present invention. Therefore, the invention is intended to be restricted only by the appended claims.

The invention claimed is:

1. A method for adjusting a mount for an optical element, the optical element being held in the mount and comprising a first optical surface without rotational symmetry in relation to an imaging axis of the optical element, to a deviation of an actual pose of the first optical surface from a target pose of the first optical surface in the mount, the method comprising:
    specifying a target pose for the first optical surface in a given coordinate system in which a relative position and/or orientation of the mount is also specified;
    ascertaining an actual pose of the first optical surface in the given coordinate system;
    ascertaining a change in the relative position and/or orientation of the mount in the given coordinate system such that a deviation of the actual pose of the first optical surface from the target pose is compensated in at least one degree of freedom by changing the relative position and/or orientation of the mount in the given coordinate system;
    forming a reference element on the mount,
    wherein the reference element defines the relative position and/or orientation of the mount which realizes the ascertained change,
    wherein the reference element defines at least one specific azimuthal alignment of the mount in the given coordinate system,
    wherein the change in the relative position and/or orientation of the mount is ascertained by adjusting the actual pose of the first optical surface to the target pose of the first optical surface, and
    wherein the change in the actual pose arising from adjusting the actual pose to the target pose of the first optical surface represents the change in the relative position and/or orientation of the mount.

2. The method of claim 1, further comprising taking into account a relative position and/or orientation deviation of a superordinate assembly in which the mount comprising the reference element can be installed.

3. The method of claim 1, wherein the reference element is not formed in rotationally symmetric fashion with respect to an imaging axis of the first optical surface.

4. The method of claim 1, wherein the reference element is formed such that the reference element defines a specific alignment of the mount in three rotational degrees of freedom.

5. The method of claim 1, wherein the reference element is formed such that the reference element additionally defines a specific relative position of the mount in at least two translational degrees of freedom.

6. The method of claim 1, wherein:
    the target pose of the first optical surface is provided by a relative position of a plurality of target surface points in the given coordinate system,
    a respective relative position in the given coordinate system is captured by measurement for a plurality of surface measurement points on the first optical surface, and
    the actual pose of the first optical surface is adjusted to the target pose of the first optical surface by adjusting the relative position of the surface measurement points to the relative position of the target surface points.

7. The method of claim 6, wherein adjusting the relative position of the surface measurement points to the relative position of the target surface points comprises:
    specifying a target function which represents a measure for a global deviation of the relative position of the surface measurement points from the relative position of the target surface points, and
    changing the relative position of the surface measurement points while maintaining their relative position with respect to one another aided by rigid transformations until the target function satisfies a termination criterion.

8. The method of claim 6, further comprising carrying out a check for each surface measurement point as to whether a given quality criterion is satisfied and only the surface measurement points satisfying the quality criterion are taken into account for adjusting the relative position of the surface measurement points to the relative position of the target surface points.

9. The method of claim 1, wherein the change in the relative position and/or orientation of the mount is ascertained iteratively.

10. The method of claim 9, wherein the quality criterion being satisfied by the considered surface measurement points is rechecked at least once within the iterative ascertainment of the change in the relative position and/or orientation of the mount, and wherein only the surface measurement points that satisfy the quality criterion again are still taken into account going forward from the subsequent iteration step.

11. The method of claim 1,
wherein the optical element comprises a second optical surface with a target pose in the given coordinate system,
wherein the method further comprises adjusting the mount both to the deviation of the actual pose of the first optical surface from the target pose of the first optical surface in the mount and the deviation of the actual pose of the second optical surface from the target pose of the second optical surface in the mount, and
wherein a uniquely determined change is ascertained by curve fitting in the case of a change in the relative position and/or orientation of the mount in the given coordinate system that is overdetermined as a result of the two optical surfaces.

12. A method for adjusting a mount for an optical element, the optical element being held in the mount and comprising a first optical surface without rotational symmetry in relation to an imaging axis of the optical element, to a deviation of an actual pose of the first optical surface from a target pose of the first optical surface in the mount, the method comprising:
specifying a target pose for the first optical surface in a given coordinate system in which a relative position and/or orientation of the mount is also specified;
ascertaining an actual pose of the first optical surface in the given coordinate system;
ascertaining a change in the relative position and/or orientation of the mount in the given coordinate system such that a deviation of the actual pose of the first optical surface from the target pose is compensated in at least one degree of freedom by changing the relative position and/or orientation of the mount in the given coordinate system;
forming a reference element on the mount,
wherein the reference element defines the relative position and/or orientation of the mount which realizes the ascertained change,
wherein the reference element defines at least one specific azimuthal alignment of the mount in the given coordinate system, and
wherein forming the at least one reference element on the mount is implemented by subtractive processing and/or by additive processing of the mount.

13. The method of claim 12, wherein the subtractive and/or additive processing of the mount is implemented under numerical control via a processing apparatus having at least three positioning axes.

14. The method of claim 13, wherein the at least three positioning axes comprise at least one rotational positioning axis and two translational positioning axes.

15. An optical component, comprising:
a mount; and
an optical element, the optical element being held in the mount and having at least one first optical surface without rotational symmetry in relation to an imaging axis of the optical element,
wherein the mount comprises at least one reference element that defines in a given coordinate system a relative position and/or orientation of the mount with respect to a holding element when the mount with the optical element is mounted in the holding element, which relative position and/or orientation of the mount in the holding element compensates, at least in one degree of freedom, a deviation of an actual pose of the first optical surface from a target pose of the first optical surface in said given coordinate system, where at least the deviation of the actual azimuthal orientation of the optical surface from its target azimuthal orientation in said given coordinate system is compensated by the relative installation position of the mount in the holding element when the optical element is mounted in the holding element.

16. The optical component of claim 15, wherein the at least one reference element defines a certain alignment of the mount in all three rotational degrees of freedom.

17. The optical component of claim 15, wherein the at least one reference element additionally defines a certain relative position of the mount in at least two translational degrees of freedom.

18. The optical component of claim 15, wherein the at least one reference element permits a displacement of the mount along a defined direction.

19. An optical assembly, comprising:
at least one optical component as claimed in claim 15; and
a holding element that holds the at least one optical component,
wherein the holding element adjusts the at least one optical component in conjunction with the at least one reference element,
wherein the at least one reference element of the mount of the optical component interacts with the holding element for adjustment purposes such that a defined relative position and/or orientation of the first optical surface in relation to the holding element is formed.

* * * * *